(12) United States Patent
Yamasaki et al.

(10) Patent No.: US 7,480,928 B2
(45) Date of Patent: Jan. 20, 2009

(54) OPTICAL RECORDING MEDIUM AND METHOD OF PRODUCING THE SAME

(75) Inventors: Takeshi Yamasaki, Kanagawa (JP); Tomomi Yukumoto, Chiba (JP); Toshiyuki Kashiwagi, Tokyo (JP)

(73) Assignee: Sony Corporation, Tokyo (JP)

( * ) Notice: Subject to any disclaimer, the term of this patent is extended or adjusted under 35 U.S.C. 154(b) by 501 days.

(21) Appl. No.: 11/134,496

(22) Filed: May 20, 2005

(65) Prior Publication Data

US 2005/0226138 A1    Oct. 13, 2005

Related U.S. Application Data

(62) Division of application No. 10/432,923, filed as application No. PCT/JP02/10010 on Sep. 27, 2002, now abandoned.

(30) Foreign Application Priority Data

Sep. 28, 2001    (JP) .............................. 2001-301327

(51) Int. Cl.
*G11B 7/24* (2006.01)
(52) U.S. Cl. ..................... 720/719; 428/64.1
(58) Field of Classification Search .............. 428/64.1, 428/423.1, 480; 369/283; 720/719
See application file for complete search history.

(56) References Cited

U.S. PATENT DOCUMENTS

| | | | | |
|---|---|---|---|---|
| 4,869,967 | A | * | 9/1989 | Inoue et al. .................. 428/480 |
| 4,962,001 | A | * | 10/1990 | Takasa et al. ................ 428/524 |
| 5,891,566 | A | * | 4/1999 | Sakumoto et al. ........... 428/343 |
| 6,042,919 | A | * | 3/2000 | Gorsuch ..................... 428/64.1 |
| 6,136,444 | A | * | 10/2000 | Kon et al. ................. 428/423.1 |
| 6,707,787 | B2 | * | 3/2004 | Yamasaki et al. ........... 369/283 |
| 6,986,861 | B2 | * | 1/2006 | Yamasaki et al. ........... 264/255 |
| 2001/0025937 | A1 | * | 10/2001 | Imai .......................... 250/591 |

FOREIGN PATENT DOCUMENTS

| | | | |
|---|---|---|---|
| JP | 62-41024 | | 2/1987 |
| JP | 62262248 | A * | 11/1987 |
| JP | 64-35740 | | 2/1989 |
| JP | 08-63784 | | 3/1996 |

(Continued)

OTHER PUBLICATIONS

Japanese Office Action issued on Jul. 8, 2008.

*Primary Examiner*—Tianjie Chen
(74) *Attorney, Agent, or Firm*—Sonnenschein Nath & Rosenthal LLP

(57) ABSTRACT

An optical recording medium capable of suppressing warps arising during a long time use and a method of producing the same, which has the configuration of comprising a substrate 13, an optical recording layer 14 formed on the substrate 13 and a light transmitting protective film 17 formed on the optical recording layer 14, wherein the protective film 17 includes a polymer film 16 having a thermal shrinkage coefficient of 0.02% or less and an adhesive layer 15 for adhering the polymer film 16 to the optical recording layer 14. As the polymer film 16, those produced by a melt cast method, subjected to annealing processing in advance or having a residual solvent of 0.3% by weight or less in the film may be preferably used.

3 Claims, 13 Drawing Sheets

FOREIGN PATENT DOCUMENTS

| | | |
|---|---|---|
| JP | 09-007234 | 1/1997 |
| JP | 10-249975 | 9/1998 |
| JP | 11-238255 | 8/1999 |
| JP | 2000-72900 | 3/2000 |
| JP | 2001-43566 | 2/2001 |
| JP | 2001-209971 | 8/2001 |
| JP | 2001-209973 | 8/2001 |
| JP | 2001209973 A * | 8/2001 |
| JP | 2001-250269 | 9/2001 |
| JP | 2001250269 A * | 9/2001 |
| JP | 2002-74749 | 3/2002 |

* cited by examiner

OPTICAL RECORDING MEDIUM AND METHOD OF PRODUCING THE SAME

RELATED APPLICATION DATA

The present application is a divisional patent application of U.S. Ser. No. 10/432,923 filed May 28, 2003, now abandoned incorporated herein by reference to the extent permitted by law, which is a 371 of PCT/JP02/10010 filed Sep. 27, 2002, all of which claim the benefit of priority to Japanese Application No. 2001-301327 filed Sep. 28, 2001.

TECHNICAL FIELD

The present invention relates to an optical recording medium having an optical recording layer for optically recording information and a method of producing the same.

BACKGROUND ART

In recent years, studies on optical information recording methods have been carried out in various places in a field of information recording. The optical information recording methods have a number of advantages such that noncontact recording and reproducing can be performed and adopting to memory forms of read-only type, write-once-read-many type and rewritable type is possible, and a wide use thereof from industrial use to consumer use has been considered as methods of realizing an inexpensive large capacity file.

Achieving of a large capacity of optical recording media (hereinafter, also referred to as optical disks) for the above variety of optical information recording methods has been made mainly by shortening the wavelength of the laser light used as a light source in an optical information recording method and by increasing the numerical aperture (NA) of the objective lens to make a spot size small on a focal plane.

For example, in CDs (compact disks), a laser light wavelength is 780 nm, a numerical aperture (NA) of an objective lens is 0.45 and a capacity is 650 MB, while in DVD-ROMs (digital versatile disk—read only memory), the laser light wavelength is 650 nm, the NA is 0.6 and the capacity is 4.7 GB.

Furthermore, in an optical disk system of the next generation, a large capacity of 22 GB or more can be attained by making the laser light wavelength 450 nm or less and the NA 0.78 or more by using an optical disk wherein a thin light transmitting protective film (a cover layer) of, for example, 100 μm or so is formed on an optical recording layer.

FIG. 1A is a schematic perspective view of an optical disk for the above optical disk system of the next generation.

An optical disk D has an approximately disk shape with a center hole CH formed at its center portion and is driven to rotate in the drive direction DR.

When recording or reproducing information, a laser light of a blue to bluish violet color region or other light LT is irradiated on an optical recording layer in the optical disk DC by an objective lens OL having a numerical aperture of, for example, 0.8 or more for being used.

FIG. 1B is a schematic cross-sectional view of the optical disk shown in FIG. 1A, and FIG. 1C is an enlarged cross-sectional view of a key portion of the schematic cross-sectional view of FIG. 1B.

One surface of a disk substrate 13 made by a polycarbonate resin, etc. having a thickness of 1.1 mm or so is provided with grooves 13a for separating track regions and formed with an optical recording layer 14 comprising for example a reflection film, a dielectric film, a recording film, another dielectric film, etc. stacked in this order. The configuration and the number of layers of the optical recording layer 14 differ in accordance with the type of recording material and design.

The above recording film is, for example, a recording film of a phase-change type, a magneto-optical recording film or a recording film including an organic dye.

Furthermore, a light transmitting protective film 37 having a film thickness of 0.1 mm composed of an adhesive layer 35 made by an adhesive or a pressure-sensitive tackiness agent film, etc. and a polymer film 36 is formed on the optical recording layer 14.

When recording or reproducing information on or from the above optical disk, a light LT, such as a laser light, is irradiated on the optical recording layer 14 by the objective lens OL from the protective film 37 side.

When reproducing information from the optical disk, a returned light reflected on the optical recording layer 14 is received by a light receiving element, a predetermined signal is generated by a signal processing circuit and a reproduction signal is taken out.

In the optical disk as above, the optical recording layer 14 has irregularity shapes in accordance with the grooves 13a provided on one surface of the disk substrate 13, and the track regions are separated by the grooves 13a.

For example, the regions which are projecting to the protective film 37 side when viewing from the disk substrate 13 side are referred as "lands" L, while recessed regions are referred as "grooves" G.

For example, a land/groove recording method for recording information both on the land and the groove can be adopted, and also only one of the land and groove may be used as a recording area.

The above optical disk is an optical disk of a type of irradiating a laser light to the optical recording layer 14 through the protective film 37 and reading a reflected light, and thereby, it can deal with an increased numerical aperture.

A method of producing the above optical disk shown in FIG. 1A to FIG. 1C will be explained.

First, a disk substrate 13 made by a polycarbonate resin, etc. having a film thickness of 1.1 mm or so being formed on its surface an irregularity pattern for an optical recording layer is formed, for example, by injection molding, on which an optical recording layer 14 having a stacked layer body of a reflection film, a dielectric film, a recording film, another dielectric film is formed on the irregularity pattern in this film forming order, for example, by a spattering method, so that the optical recording layer 14 having a pattern corresponding to the above irregularity pattern is formed.

Next, a polymer film 36 is adhered on the optical recording layer 14 by an adhesive 35, such as an ultra-violet curing resin adhesive or a pressure-sensitive tackiness agent film, so as to obtain a protective film 37 composed of the adhesive layer 35 and the polymer film 36.

From the above, an optical disk having the configuration shown in FIG. 1 can be obtained.

In the optical disk of the above configuration, however, since the polymer film shrunk during a long time use, there was a problem that warps arose on the optical disk.

An amount of a coma aberration generated when the disk warp above (tangential or radial skew) arises is proportional to $NA^3/\lambda$, so when shortening wavelength of the laser light and increasing numerical aperture for a larger capacity, properties required to the optical disk become strict to suppress the coma aberration and the disk warp has to be suppressed.

The disk warp above is described to be in the radial direction and in the tangential direction, but due to shrinkage of the polymer film, a warp mainly in the radial direction is largely changed.

DISCLOSURE OF INVENTION

The present invention was made in consideration of the above circumstances and has as an object thereof to provide an optical recording medium capable of suppressing a warp arisen during a long time use and a method of producing the same.

To attain the above object, an optical recording medium of the present invention comprises a substrate, an optical recording medium formed on the substrate, and a light transmitting protective film formed on the optical recording layer; wherein the protective film comprises a polymer film having a thermal shrinkage coefficient of 0.02% or less and an adhesive layer for adhering the polymer film to the optical recording layer.

Preferably, in the above optical recording medium of the present invention, the polymer film is a polymer film produced by a melt cast method.

Preferably, in the above optical recording medium of the present invention, the polymer film is a polymer film subjected to annealing processing after being produced as a film and before being adhered to the optical recording layer in advance.

Preferably, in the above optical recording medium of the present invention, a residual solvent in the polymer film is 0.3% by weight or less.

The above optical recording medium of the present invention includes a polymer film having a thermal shrinkage coefficient of 0.02% or less and an adhesive layer for adhering the polymer film to the optical recording layer as a light transmitting protective film on the optical recording layer.

Here, the thermal shrinkage coefficient is a ratio of thermal shrinkage before and after annealing processing under a predetermined condition, such as annealing processing at 90° C. in the air for two hours, etc.

Shrinkage of the polymer film due to a temperature and humidity does not cause warps on an optical disk even after a long time under a certain condition of temperature and humidity, on the other hand, shrinkage due to evaporation of a residual solvent remained in the polymer film and a relaxation of internal strain arises irreversibly, consequently, warps arise on the optical disk even under the above predetermined condition.

In the optical recording medium of the present invention, the thermal shrinkage coefficient of the polymer film is made to be 0.02% or less, and thereby, shrinkage of the polymer film is suppressed during a long time use and arising of warps on the optical recording medium can be suppressed.

As to the above polymer film, even when the thermal shrinkage coefficient is more than 0.02%, it can be made in a range of 0.02% or less by performing annealing processing in advance before adhering to the optical recording layer, so that the above effects can be obtained.

The annealing processing may be performed, for example, at 90° C. in the air for two hours by using a circulating drying furnace, a hot plate or an infrared heating furnace, and conditions of the annealing processing may be adjusted in accordance with a thermal shrinkage coefficient of the polymer film.

Also, to attain the above object, a method of producing an optical recording medium of the present invention includes the steps of forming an optical recording layer on a substrate, and forming a light transmitting protective film on the optical recording layer, wherein the step of forming the protective film includes a step of adhering a polymer film having a thermal shrinkage coefficient of 0.02% or less to the optical recording layer via an adhesive layer.

Preferably, in the above method of producing an optical recording medium of the present invention, a polymer film produced by a melt cast method is used as the polymer film.

Preferably, in the above method of producing an optical recording medium of the present invention, annealing processing is performed on the polymer film after the step of producing the polymer film as a film and before the step of adhering to the optical recording layer in advance.

Preferably, in the above method of producing an optical recording medium of the present invention, a polymer film wherein a residual solvent in the polymer film is 0.3% by weight or less is used as the polymer film.

In the above method of producing an optical recording medium of the present invention, an optical recording layer is formed on a substrate, then, a light transmitting protective film is formed on the optical recording layer. Here, the step of forming the protective film includes a step of adhering the polymer film having a thermal shrinkage coefficient of 0.02% or less to the above optical recording layer by an adhesive layer.

According to the above method of producing an optical recording media of the present invention, it is possible to produce an optical recording medium wherein a polymer film having a thermal shrinkage coefficient of 0.02% or less is adhered to an optical recording layer by an adhesive layer as a light transmitting protective film, shrinkage of the polymer film is suppressed in a long time use and arising of warps is suppressed.

BEST MODE FOR CARRYING OUT THE INVENTION

Below, the best mode for carrying out the invention will be explained in detail with reference to the drawings.

First Embodiment

Figure 1A:
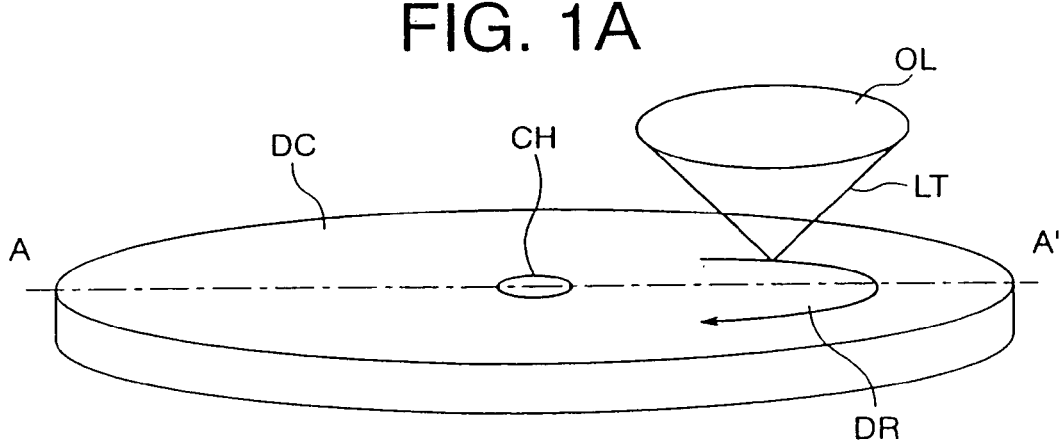
FIG. 1A is a perspective view of an optical disk according to a conventional example.
Figure 1B:
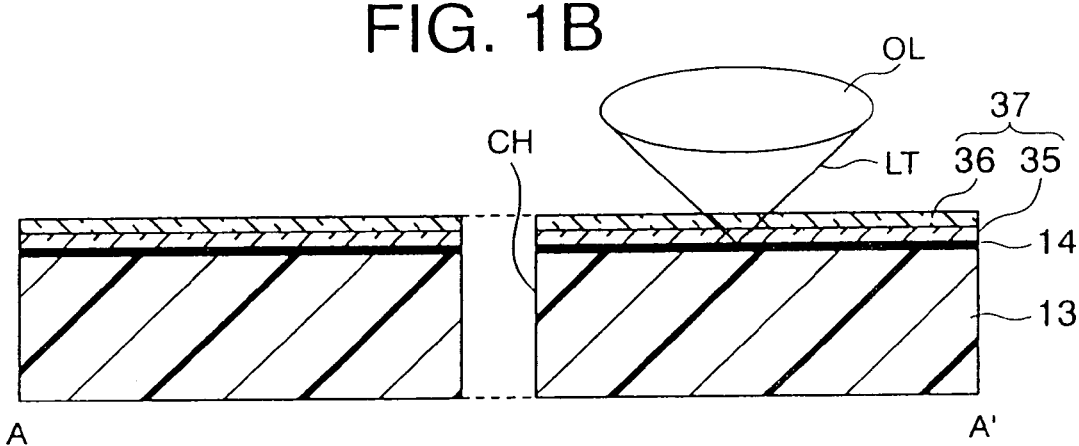
FIG. 1B is a cross-sectional view and FIG. 1C is an enlarged cross-sectional view.
Figure 1C:
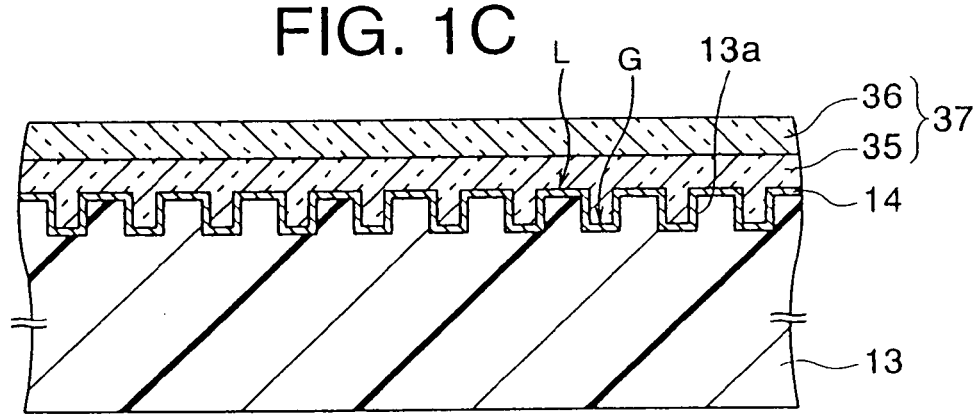
Figure 2A:
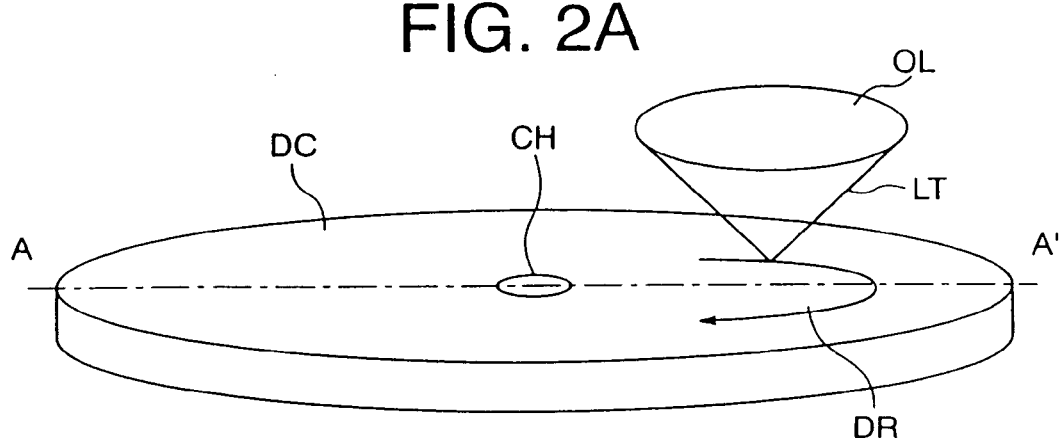
FIG. 2A is a perspective view of an optical disk according to a first and second embodiments of the present invention.

FIG. 2A is a perspective view of an optical recording medium (hereinafter, also referred to as an optical disk) according to the present embodiment.

An optical disk DC has an approximately disk shape with a center hole CH formed at its center portion and is driven to rotate in the drive direction DR.

When recording or reproducing information, a laser light of a blue to bluish violet color region or other light LT is irradiated on an optical recording layer in the optical disk DC by an objective lens OL having a numerical aperture of, for example, 0.8 or more for being used.

Figure 2B:
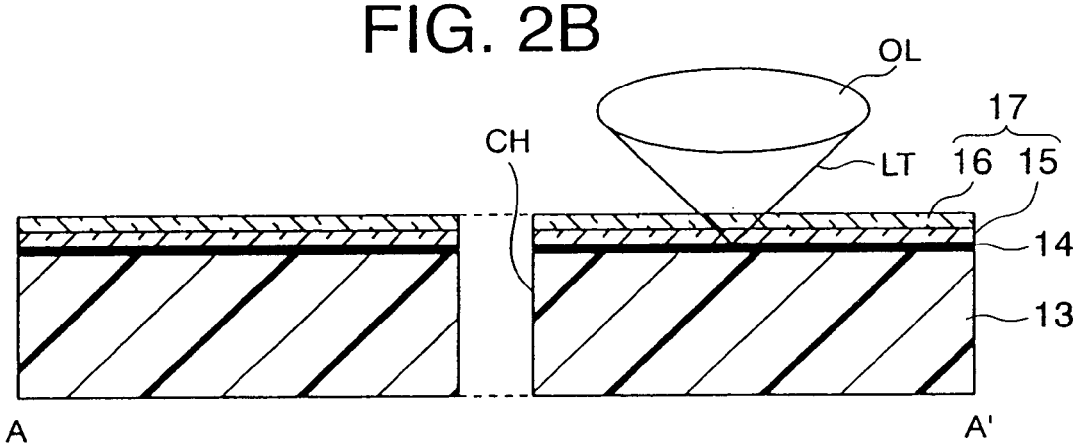
FIG. 2B is a cross-sectional view and FIG. 2C is an enlarged cross-sectional view.
Figure 2C:
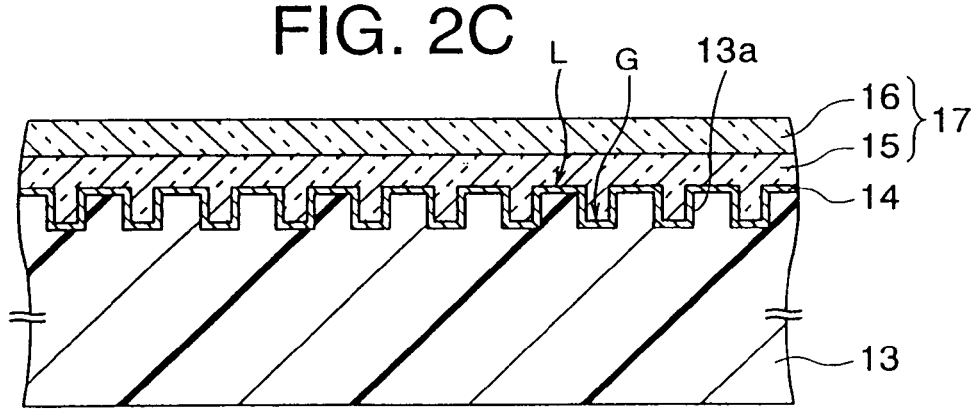

FIG. 2B is a cross-sectional view of the optical disk shown in FIG. 2A, and FIG. 2C is an enlarged cross-sectional view of a key part of the cross-sectional view of FIG. 2B.

One surface of the disk substrate 13 made by, for example, a polycarbonate resin having a film thickness of 0.3 mm or more, for example, 1.1 mm or so is provided with grooves 13a for separating track regions, such as "lands" L and "grooves" G, and an optical recording layer 14 is formed as an upper layer thereof.

The optical recording layer 14 has a configuration wherein, for example, a reflection film, a dielectric film, a recording film and another dielectric film, etc. are stacked in this order. The layer configuration and the number of layers of the optical recording layer 14 differ in accordance with the type of recording material and design.

The above recording film is, for example, a recording film of a phase-change type, a magneto-optical recording film or a recording film including an organic dye.

In the case of a ROM type optical disk, the optical recording layer 14 is composed of a reflection film made by aluminum, etc.

On the optical recording layer 14, a polymer film 16 produced, for example, by a melt cast method is stacked and adhered via an adhesive layer 15, so that the adhesive layer 15 and the polymer film 16 compose a light transmitting protective film 17 having a film thickness of 100 μm or so by putting the two together.

The above optical disk is a type wherein a laser light is irradiated on the optical recording layer 14 through the protective film 17 and the reflected light is read. Due to this type, it is possible to deal with an objective lens of an increased numerical aperture in an optical disk system.

For example, a large capacity of 22 GB or more can be attained in the optical disk system by making the laser light wavelength 450 nm or less and the NA 0.78 or more and by using an optical disk wherein a thin light transmitting protective film (a cover layer) of, for example, 100 μm or so is formed.

The optical disk of the present embodiment is characterized in that the thermal shrinkage coefficient of the polymer film 16 is 0.02% or less as in the polymer film produced, for example, by a melt cast method, etc.

Here, the thermal shrinkage coefficient is a ratio of thermal shrinkage before and after annealing processing under a predetermined condition, such as annealing processing at 90° C. in the air for two hours, etc.

As the above polymer film 16, those subjected to annealing processing in advance to make the thermal shrinkage coefficient 0.02% or less after being produced to be a film and before being adhered to an optical recording layer are preferably used.

Furthermore, a residual solvent in the polymer film is preferably 0.3% by weight or less, and thereby, the thermal shrinkage coefficient can be suppressed.

In an optical disk of the present embodiment, the light transmitting protective film includes a polymer film having a thermal shrinkage coefficient of 0.02% or less and an adhesive layer for adhering the polymer film to the optical recording layer, so that shrinkage of the polymer film over a long time use can be suppressed and arising of warps on the optical recording medium can be suppressed.

The above polymer film 16 is preferably optically transparent and has a low birefringent and a uniform film thickness. As a material fulfilling these conditions, for example, resins of polycarbonate, cyclic polyolefin and polymethylmethacrylate (PMMA), etc. and a modified acrylic resin, etc. can be used.

The adhesive layer 15 for adhering the polymer film 16 to the optical recording layer 14 to be used can be selected, for example, from an ultraviolet curing resin adhesive, a thermal curing resin adhesive, an epoxy resin adhesive and a pressures sensitive tackiness agent, etc. Alternately, two or more kinds of these may be mixed or stacked for use.

The adhesive strength by the adhesive layer 15 is made to be a degree of resisting a temperature change, a humidity change, an external impact, etc. and not causing any peeling.

The adhesive force depends on a material and film thickness of the optical recording layer 14 and those of the disk substrate 13 and the polymer film 16, etc.

To prevent corrosion and other reaction to change recording/reproducing properties of the optical recording layer 14 and diffusion, it is necessary to adjust polymer, polymer resolvent, unreacting monomer, reaction initiator, equilibrium absorption percentage, etc. in the adhesive layer 15.

Next, a method of producing an optical disk of the present embodiment will be explained with reference to cross-sectional views, schematic views or perspective views of respective production processes.

Figure 3A:
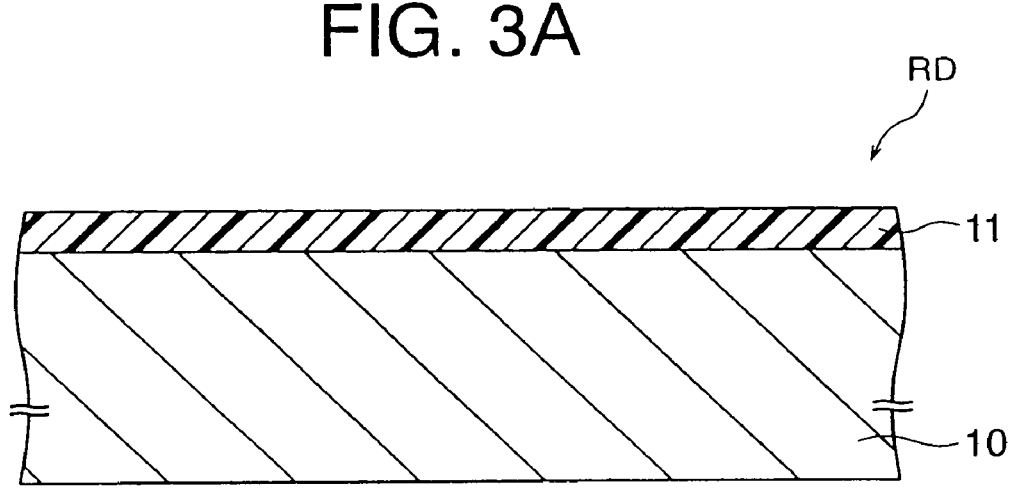
FIG. 3A and FIG. 3B are cross-sectional views of a production process of a method of producing the optical disk according to the first embodiment of the present invention.

First, a resist disk RD wherein a resist film 11 is formed on a glass substrate 10 as shown in FIG. 3A is prepared.

As the above glass substrate 10, one having a diameter of, for example, 200 mm or so and a finely polished surfaces is used.

Also, as the resist film 11, a resist of a type exposed, for example, by an ultraviolet ray or an electron beam, etc. may be used, which has a film thickness of tens to 100 nm and is formed by a spin coat method, etc.

Figure 3B:
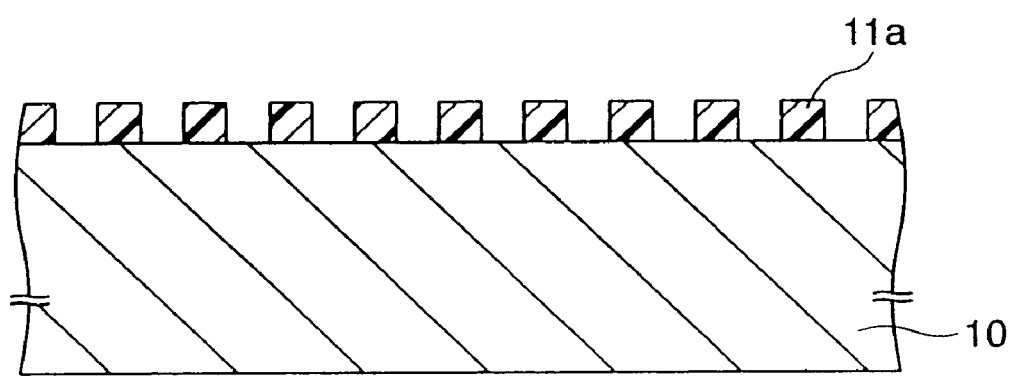

Next, as shown in a cross-sectional view in FIG. 3B, by using an ultraviolet ray exposure apparatus or an electron beam exposure apparatus, etc., an electron beam exposure is performed on the resist film 11 by a pattern of exposing a region to be a groove or a pit of the disk substrate and performing developing processing by using an exclusive liquid developer so as to obtain a resist film 11a having a pattern wherein a region to be a groove or a pit of the disk substrate is opened.

Figure 4A:
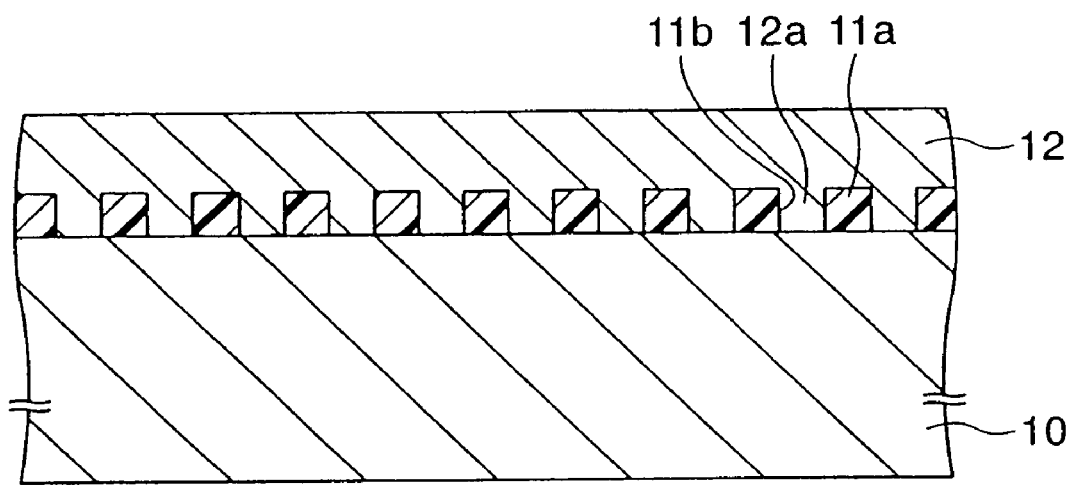
FIG. 4A is a cross-sectional view showing a process continued from FIG. 3B

Next, as shown in a cross-sectional view in FIG. 4A, a stamper 12 is formed on the above glass substrate 10 and the resist film 11a, for example, by performing nickel plating processing, etc.

On the surface of the stamper 12 is transferred an irregularity pattern which is an inverse of a groove 11b formed by the resist film 11a and a projecting portion 12a is formed.

Figure 4B:
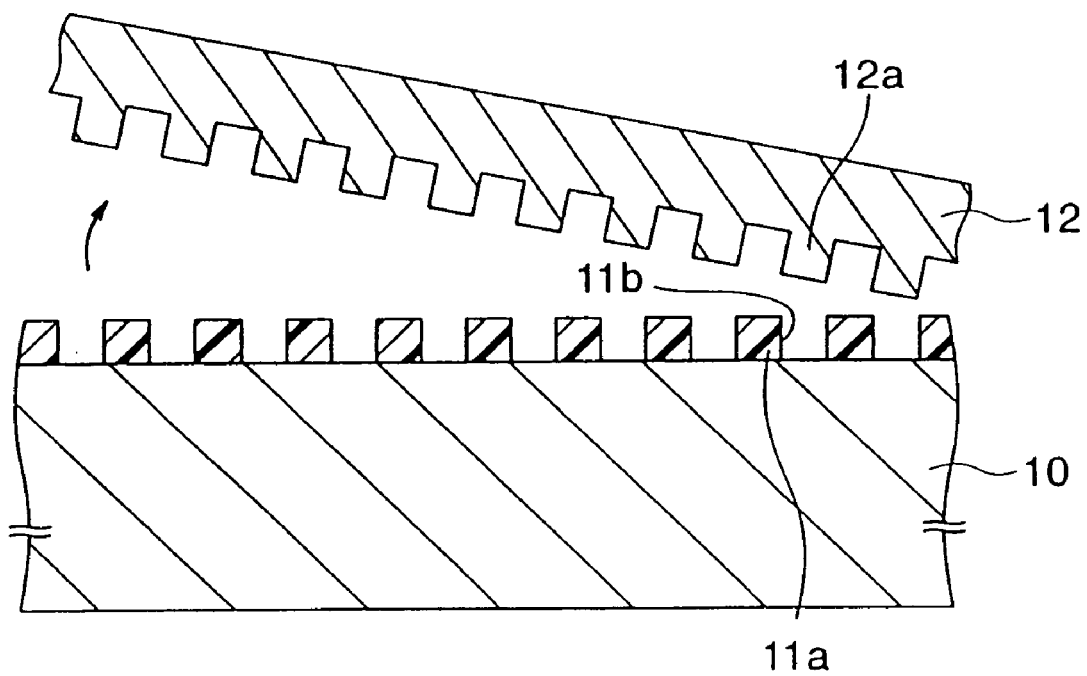
FIG. 4B is a cross-sectional view of a process continued from FIG. 4A.

Then, as shown in across-sectional view in FIG. 4B, the stamper 12 is released from the glass substrate 10 and the resist film 11a.

Figure 5A:
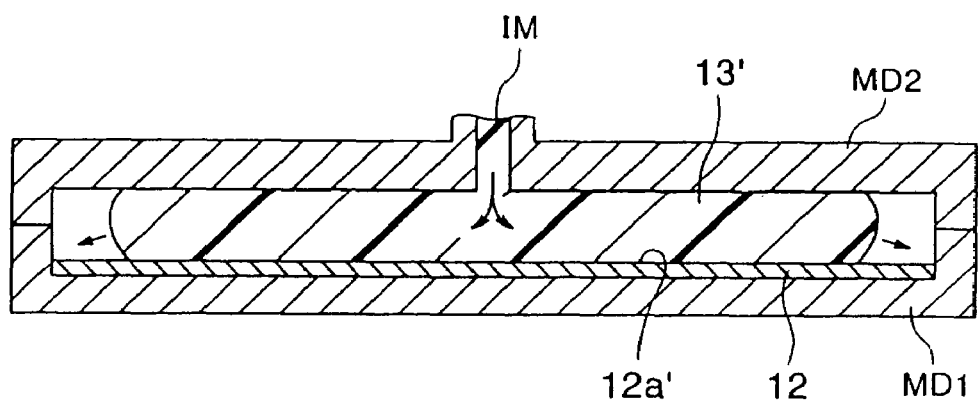
FIG. 5A is a schematic view of an injection molding process showing a process continued from FIG. 4B
Figure 5B:
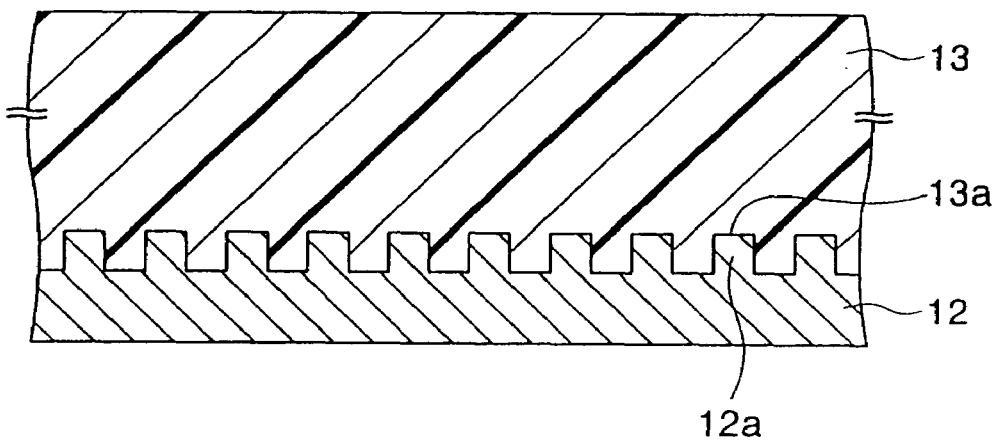
FIG. 5B is a cross-sectional view thereof.

Then, as shown in a schematic view in FIG. 5A, the stamper 12 obtained as above is fixed inside a cavity made by molds (MD1 and MD2) to compose an injection molding mold.

At this time, a projecting portion forming surface 12a' of the stamper 12 is arranged so as to face the inner surface of the cavity.

By injecting a polycarbonate resin, etc., for example, in a melt state from an inlet IM of the mold inside the cavity of the above injection molding mold, a disk substrate 13 is formed on the irregularity pattern of the stamper 12.

Here, the disk substrate 13 is transferred with a groove 13a to be a "groove" pattern or a "pit" pattern which is an inversed irregularity pattern of the irregularity pattern of the stamper 12.

Figure 6A:
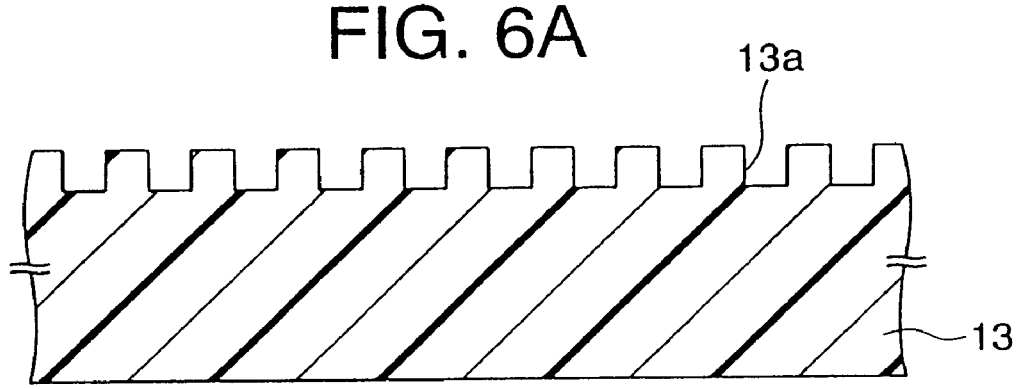
FIG. 6A is a cross-sectional view showing a process continued from FIG. 5A and FIG. 5B.

By releasing from the above injection molding mold, the disk substrate 13 being formed on its surface the groove 13a to be a "groove" pattern or a "pit" pattern as shown in a cross-sectional view in FIG. 6A is obtained.

Figure 6B:
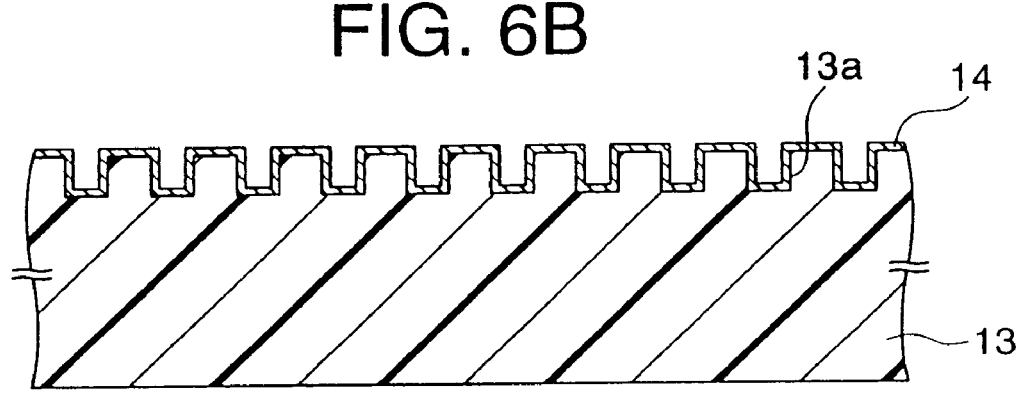
FIG. 6B is a cross-sectional view showing a process continued from FIG. 6A.

Next, as shown in a cross-sectional view in FIG. 6B, after removing dust by blowing air or gas, such as a nitride gas, to the surface of the disk substrate 13, an optical recording layer 14 having a stacked body including a reflection film, a dielectric film, a recording film and another dielectric film is formed by forming films in this order, for example, by a spattering method, etc.

As the above recording film, a recording film of a phase-change type, a magneto-optical recording film or a recording film including an organic dye may be used.

Alternately, in the case of a ROM type optical disk, the optical recording layer is formed by a reflection film of an aluminum layer, etc.

Figure 7:
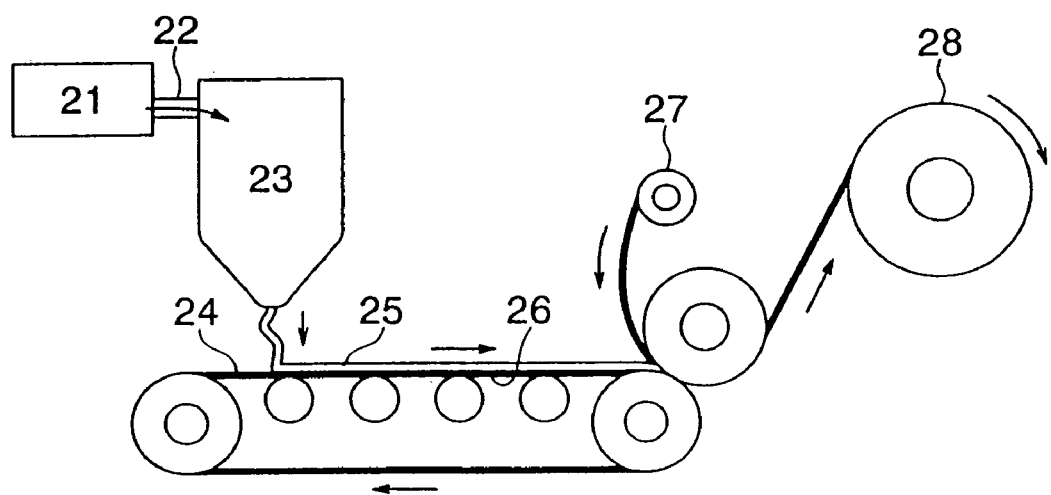
FIG. 7 is a schematic view for explaining a method of producing a polymer film by a melt cast method.

Next, a method of producing a polymer film by a melt cast method will be explained by referring to a schematic view in FIG. 7.

A polymer solution 22 obtained by resolving a polymer material into a solvent in a dissolution tank 21 and heating at a high temperature is poured to an application tank 23, and the polymer solution 22 is applied to a smooth substrate or a belt 24 from an application outlet on the bottom of the application tank 23, so that a polymer solution applied film 25 is obtained.

The above polymer solution applied film 25 is dried, that is, the solvent is evaporated while being left still or transferred on a conveyer belt 26 so as to obtain a film, which is wound together with a protection film 27 and a polymer film roll 28 is obtained.

According to the melt cast method, when producing a polymer film having a film thickness of, for example, 100 µm, a polymer solution diluted by five times by a solvent is prepared and applied to be a film thickness of 500µm. First, the film thickness is uniformized due to leveling at the time of application. An unevenness of the film thickness at this time is, for example, ±5 µm or so, but when the applied film dries to have a film thickness of 100 µm, the unevenness of the film thickness is lessened to, for example, ±1 µm or so with respect to an average value. Thus, a film wherein a film thickness unevenness is small can be obtained.

When a film made by a polycarbonate resin is used as the above polymer film, dichloromethane ($CH_2Cl_2$) used as a solvent in the melt cast method remains in the film in some cases. The residual solvent evaporates also after being adhered to the optical recording layer of the substrate composing an optical disk, so that a volume shrinkage of the polymer film is caused thereby and warps of the optical disk arise.

Accordingly, the less the residual solvent in the polymer film made by a polycarbonate resin, the better, and for example 0.3% by weight or less is preferable.

Here, those having a thermal shrinkage coefficient of 0.02% or less are used as the above polymer film.

Here, the thermal shrinkage coefficient is a ratio of thermal shrinkage before and after annealing processing under a predetermined condition, such as annealing processing at 90° C. in the air for two hours, etc.

When the thermal shrinkage coefficient of the polymer film is more than 0.02%, it may be used by being subjected to annealing processing at 90° C. in the air for two hours, for example, by using a circulating drying furnace, a hot plate or an infrared heating furnace to evaporate the residual solvent in the polymer film or to relax internal strain to make the thermal shrinkage coefficient within a range of 0.02% or less.

The annealing condition may be adjusted in accordance with a thermal shrinkage coefficient of the polymer film.

Figure 8:
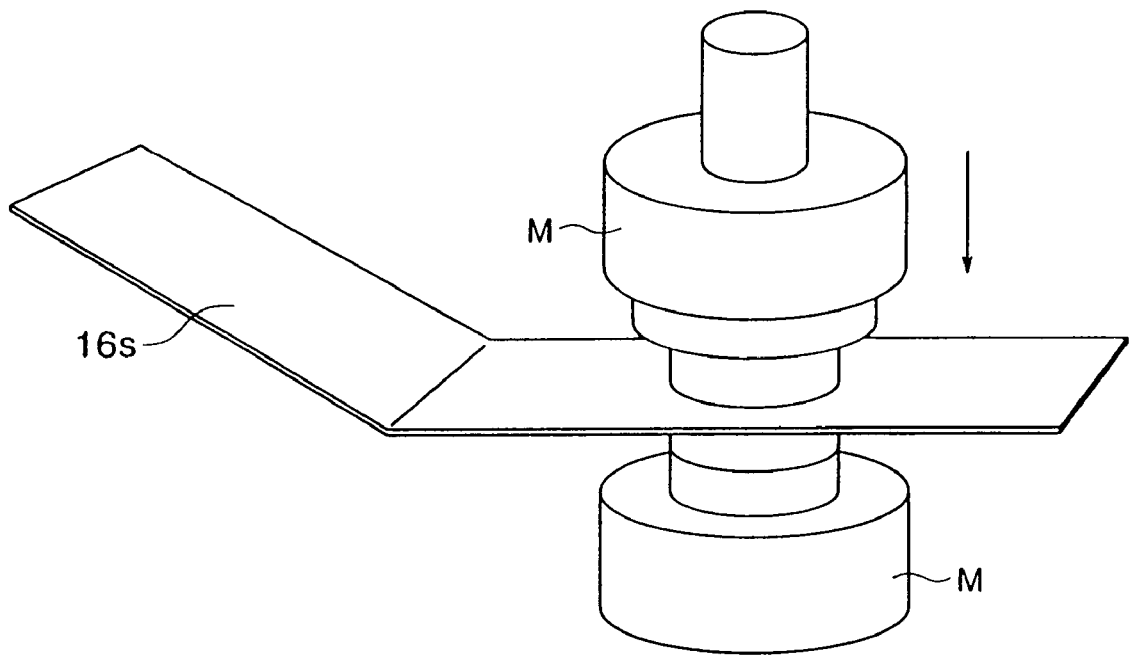
FIG. 8 is a perspective view for explaining a stamping process of the polymer film.

The polymer film 16s in a sheet shape produced as above may be used, for example, by being stamped out to be an optical disk size by a stamping machine M as shown in a perspective view in FIG. 8.

In processes thereafter, the above polymer film is adhered via an adhesive layer to the optical recording layer 14 formed on the disk substrate 13 shown in FIG. 6B.

Figure 9A:
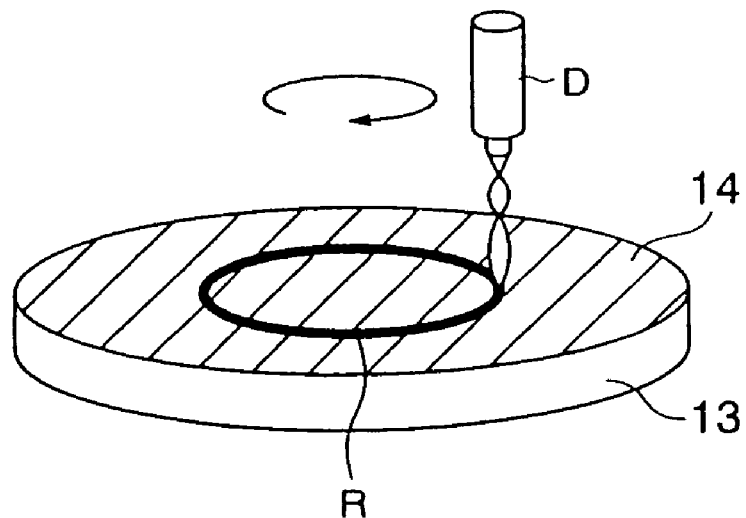
FIG. 9A is a perspective view showing a process continued from FIG. 6B.

First, as shown in a perspective view in FIG. 9A, an adhesive R, such as a liquid ultraviolet curing resin, a thermal curing resin or an epoxy resin, is supplied on the optical recording layer 14 by a dispenser D while rotating the disk substrate 13.

Figure 9B:
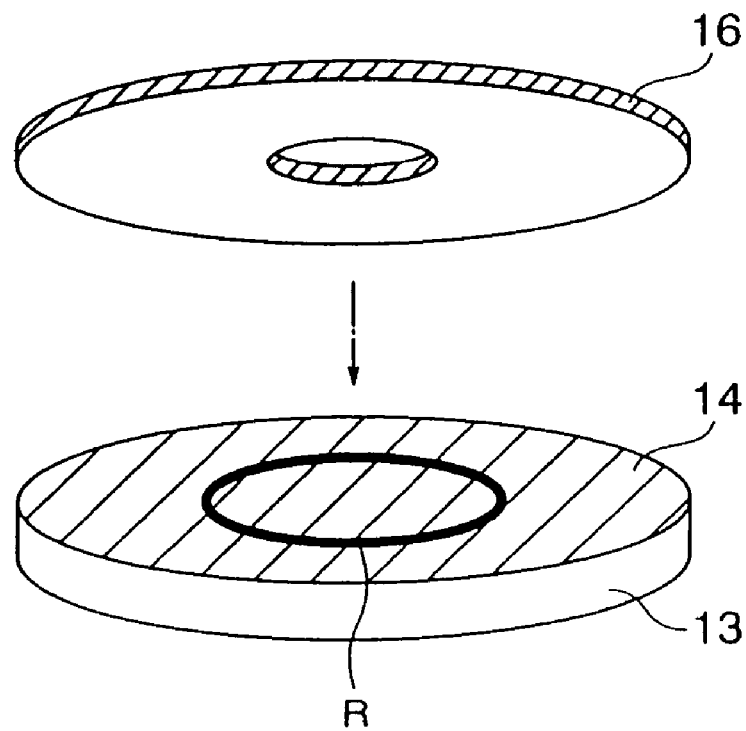
FIG. 9B is a perspective view showing a process continued from FIG. 9A.

Next, as shown in a perspective view in FIG. 9B, the polymer film 16 composed of a polycarbonate resin, etc. produced by a melt cast method and stamped out to be a disk shape is superimposed on the optical recording layer 14 on which the adhesive R is supplied. The polymer film 16 is subjected to annealing processing in advance, if necessary.

Figure 10A:
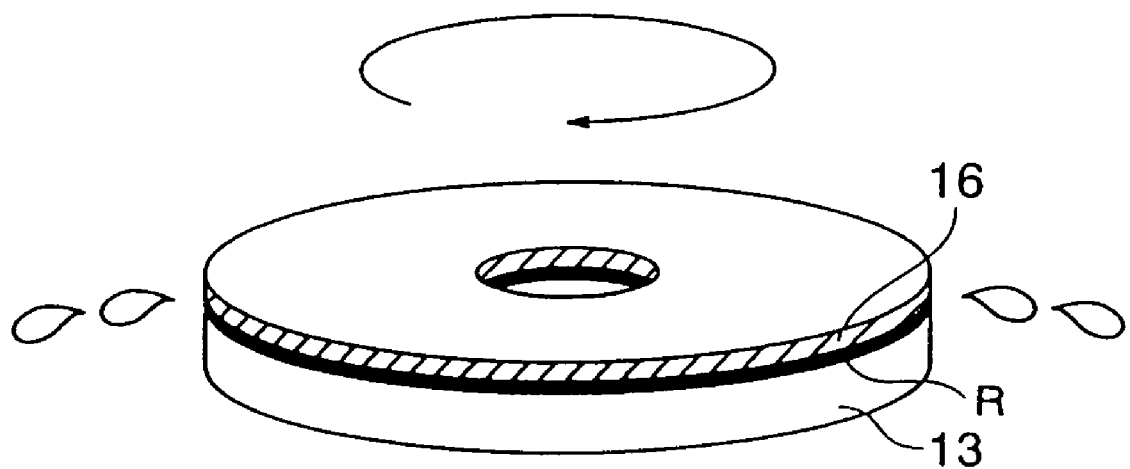
FIG. 10A is a perspective view showing a process continued from FIG. 9B.

Then, as shown in a perspective view in FIG. 10A, the adhesive R is supplied evenly between the optical recording layer 14 and the polymer film 16 due to a centrifugal force by spinning the disk substrate 13 at a high speed, and an excessive adhesive is swished off.

Figure 10B:
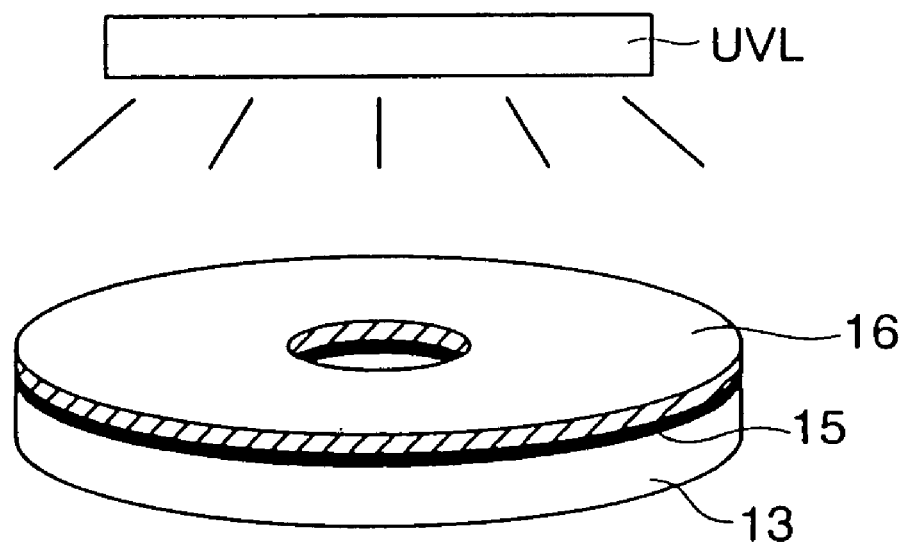
FIG. 10B is a perspective view showing a process continued from FIG. 10A.

Next, as shown in a perspective view in FIG. 10B, curing processing is performed, such as ultraviolet irradiation processing by an ultraviolet lamp UVL when the adhesive R is an ultraviolet curing resin, or thermal processing in the case of a thermal curing resin, so that a cured adhesive layer 15 is obtained.

From the above processes, an optical disk having the configuration shown in FIG. 2 can be produced.

According to the method of producing an optical disk of the present embodiment as above, it is possible to produce an optical recording medium wherein a polymer film having a thermal shrinkage coefficient of 0.02% or less is adhered to an optical recording layer via an adhesive layer as a light transmitting protective film, a polymer film shrinkage is suppressed during a long time use, and arising of warps is suppressed.

Second Embodiment

The configuration of an optical disk according to the present embodiment is the same as that of an optical disk according to the first embodiment. Note that it is different in using an adhesive film, such as a pressure sensitive tackiness agent film, as an adhesive layer 15 for adhering a polymer film 16 to an optical recording layer 14.

For example, when assuming that a film thickness of a protective film is 100 μm, a film thickness of the adhesive layer made of a tackiness agent is made to be 25 μm and that of the polymer film 75 μm.

A method of producing the above optical disk of the present embodiment will be explained with reference to drawings.

Figure 11A:
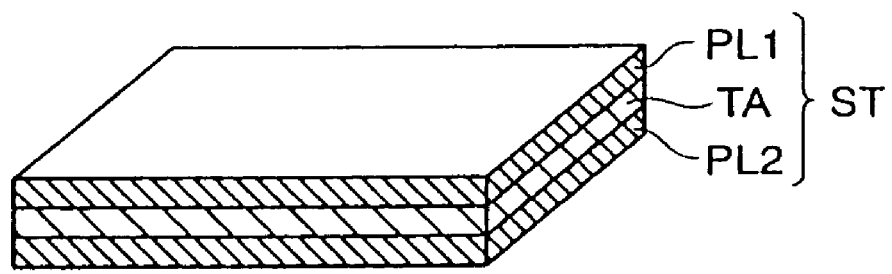
FIG. 11A and FIG. 11B are perspective views showing a production process of a method of producing an optical disk according to a second embodiment of the present invention.

First, as shown in a perspective view in FIG. 11A, a stacked tackiness agent film ST wherein a tackiness agent film TA is sandwiched by two PET (polyethylene terephthalate) liners (PL1 and PL2) is prepared.

Figure 11B:
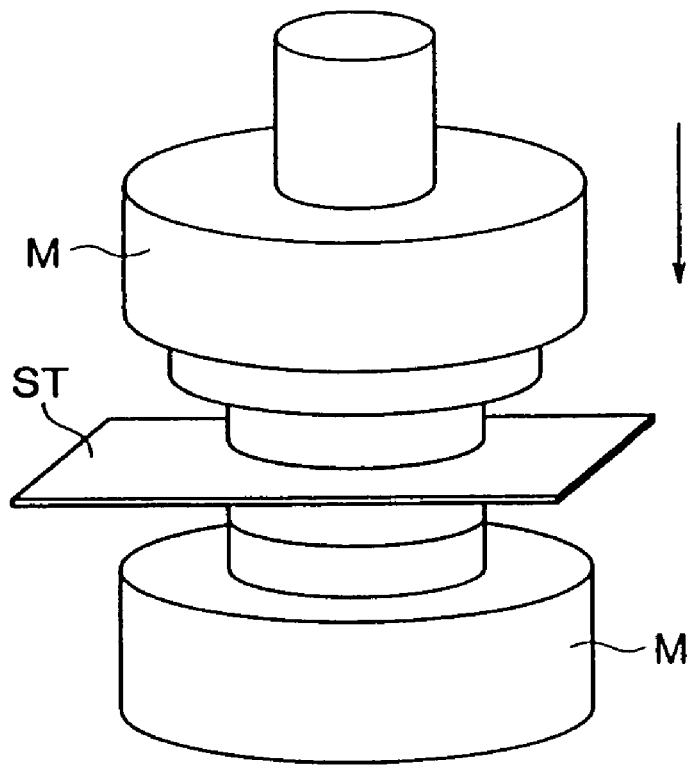

Next, as shown in a perspective view in FIG. 11B, the above stacked tackiness agent film ST is stamped out to be an optical disk size by a stamping machine M.

Figure 12A:
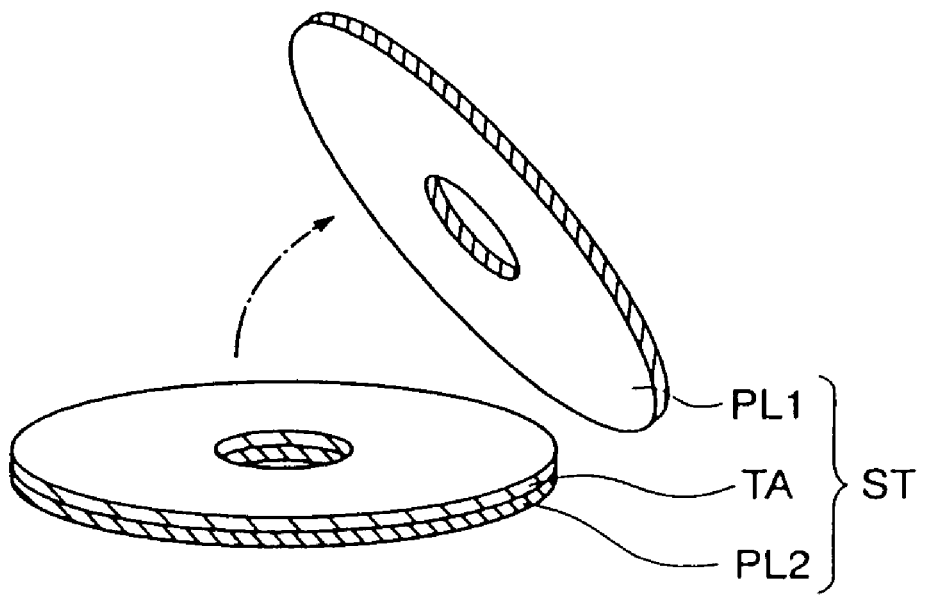
FIG. 12A is a perspective view showing a process continued from FIG. 11B.

Then, as shown in a perspective view in FIG. 12A, the PET liner PL1 on one side of the above stacked tackiness agent film ST stamped out to be an optical disk size is peeled.

Figure 12B:
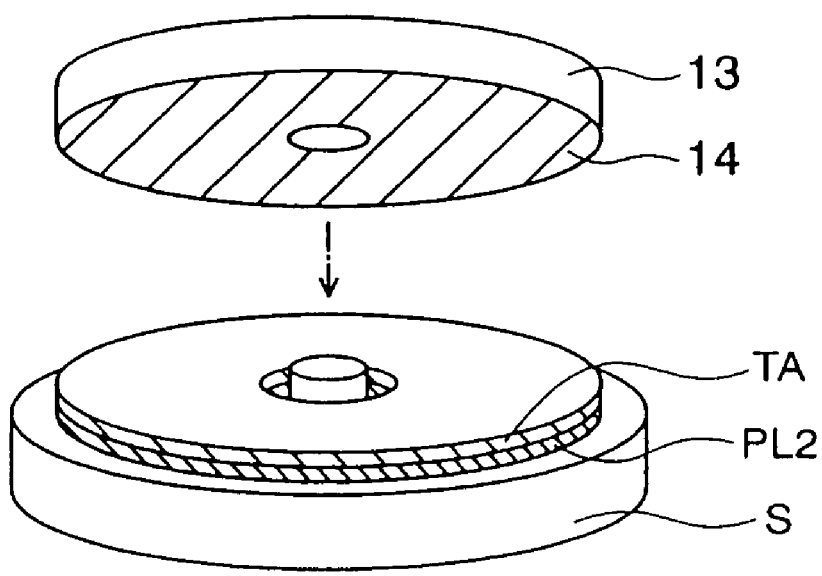
FIG. 12B is a perspective view showing a process continued from FIG. 12A.

Next, as shown in a perspective view in FIG. 12B, a thus obtained tackiness agent film TA having the PET liner PL2 on its one side is set on a base S having a projection for aligning at the center, and thereon, a disk substrate 13 made by a polycarbonate resin, etc. on which an optical recording layer 14 formed by the separated process in the same way as in the first embodiment is aligned to be set with its optical recording layer 14 side facing to the tackiness agent film TA side.

Figure 13A:
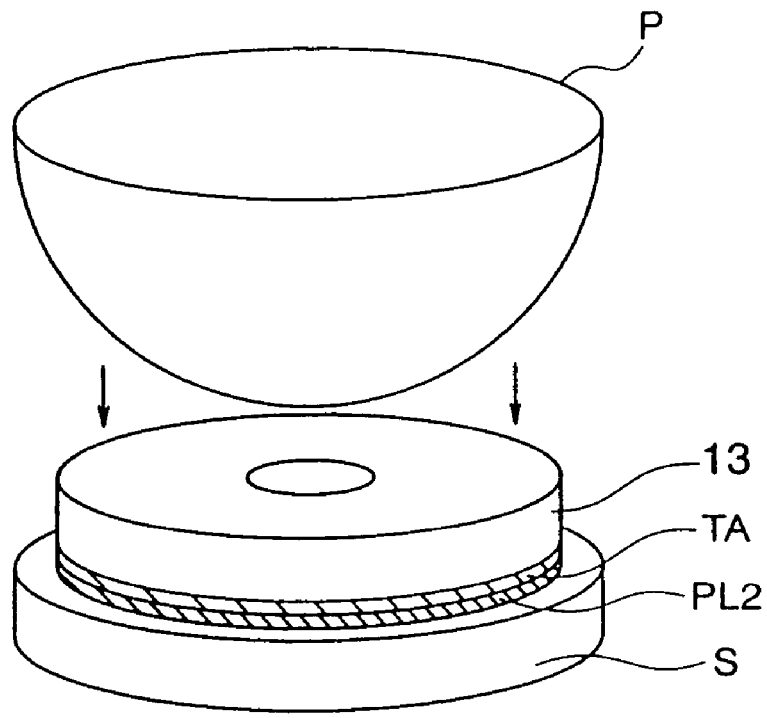
FIG. 13A is a perspective view showing a process continued from FIG. 12B.

Then, as shown in a perspective view in FIG. 13A, a pressure is given on the disk substrate 13 from above by a pad P or a roller, etc., so that the optical recording layer 14 formed on the disk substrate 13 and the tackiness agent film TA are sufficiently adhered.

Figure 13B:
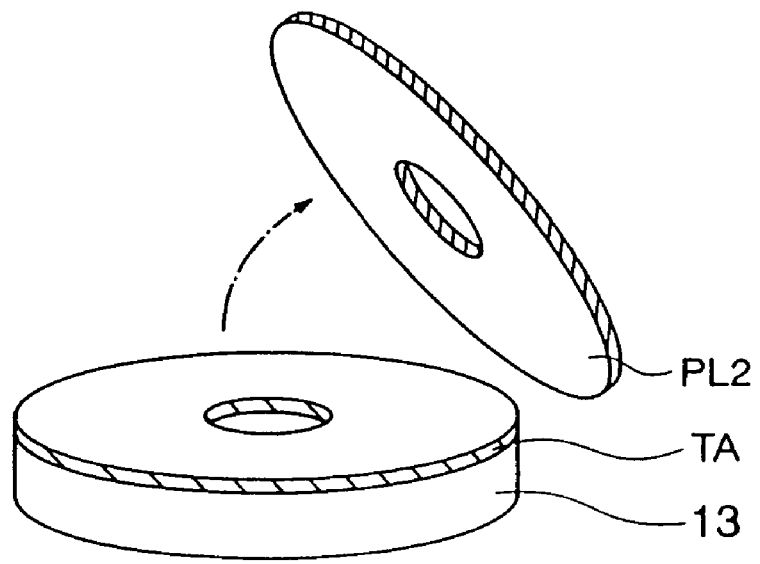
FIG. 13B is a perspective view showing a process continued from FIG. 13A.

Next, as shown in a perspective view in FIG. 13B, the PET liner PL2 remained on the other side of the tackiness agent film TA is peeled off.

Figure 14A:
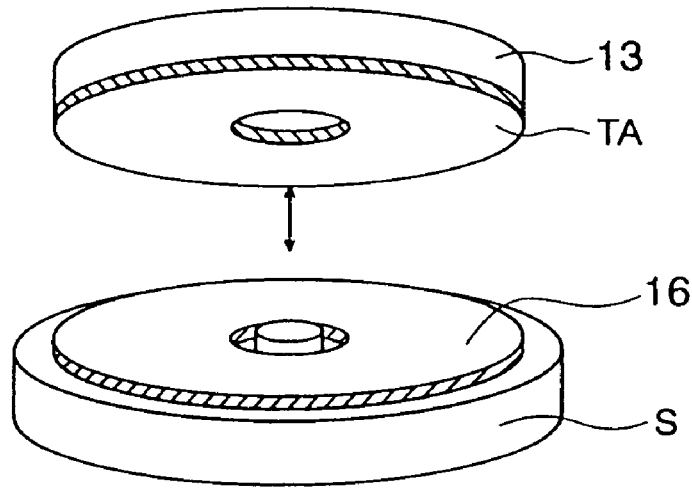
FIG. 14A is a perspective view showing a process continued from FIG. 13B.

Next, as shown in a perspective view in FIG. 14A, a polymer film 16 formed by the separated process in advance is set on the base S having a projection for aligning at the center, and thereon, the disk substrate 13 being adhered the above tackiness agent film TA is aligned to be set with the tackiness agent film TA side facing to the polymer film 16 side.

Figure 14B:
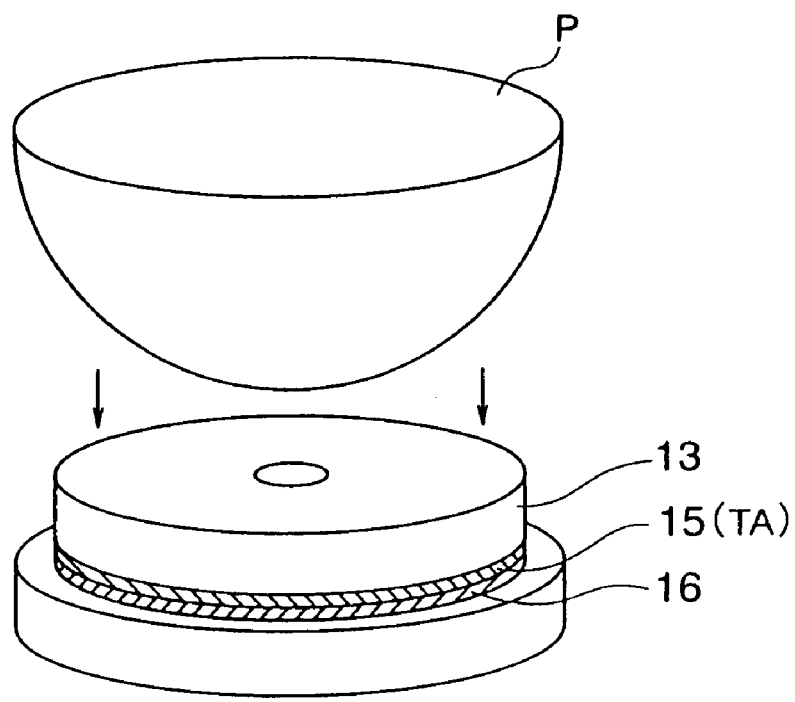
FIG. 14B is a perspective view showing a process continued from FIG. 14A.

Then, as shown in a perspective view in FIG. 14B, a pressure is given on the disk substrate 13 from above by a pad P or a roller, etc., so that the polymer film 16 and the tackiness agent film TA are sufficiently adhered.

From the above processes, an optical disk wherein the adhesive layer 15 is composed of the tackiness agent film TA in the configuration shown in FIG. 2 can be produced.

According to the method of producing an optical disk of the above present embodiment, it is possible to produce an optical recording medium wherein a polymer film having a thermal shrinkage coefficient of 0.02% or less is adhered to an optical recording layer via an adhesive layer as a light transmitting protective film, shrinkage of a polymer film is suppressed during a long time use, and arising of warps is suppressed.

EXAMPLE 1

Polymer films made by a polycarbonate resin was prepared by a melt cast method.

Namely, dichloromethane was used as a solvent, a solution of a polycarbonate resin and dichloromethane was applied thinly on a cast at a high temperature and dried to prepare polymer films having a film thickness of 75 μm.

At this time, polymer films having a different thermal shrinkage coefficient were obtained by adjusting a drying condition and a tension at the time of pulling up the film.

Next, an irregularity pattern for optical recording layer is formed on the polycarbonate substrate having an outer diameter of 120 mm, an inner diameter of 15 mm and a thickness of 1.1 mm by injection molding, an aluminum optical recording layer is formed thereon, a pressure sensitive tackiness agent film (CS9603 made by Nitto Denko Corporation) having a film thickness of 25 μm is adhered on its surface, and the above polycarbonate film is adhered thereon to prepare samples.

Here, seven kinds of films wherein the thermal shrinkage coefficient was different (0.01%, 0.02%, 0.03%, 0.05%, 0.09%, 0.12% and 0.15%) were used as the polycarbonate film to prepare four optical disk samples.

As an accelerate condition, the above optical disk samples were left for 96 hours under a high temperature and high humidity atmosphere of a temperature of 80° C. and a humidity of 85%, and changes of a radial skew were measured before and after that.

Here, in a state where the center portion of the disk was held on a reference plane, a light vertical with respect to a reference plane was irradiated to the surface of a disk edge portion and a reflection angle of an obtained reflected light was measured so as to measure an inclination of the surface at the disk edge portion as the radial skew.

Since a value of the radial skew becomes maximum at the outer diameter of the disk, measurement was made at a position at a radius of 58 mm in the present example.

The results are shown in Table 1.

TABLE 1

| Thermal Shrinkage Coefficient (%) | Radial Skew Change (degree) |
| --- | --- |
| 0.01 | −0.04 |
| 0.02 | −0.09 |
| 0.03 | −0.13 |
| 0.05 | −0.24 |
| 0.09 | −0.71 |
| 0.12 | −1.01 |
| 0.15 | −1.20 |

From the Table 1, a change value of the radial skew becomes smaller as the thermal shrinkage coefficient becomes smaller, while the change value of the radial skew becomes larger as the thermal shrinkage coefficient becomes larger.

It was found that a change of the radial skew was preferably within ±0.1 degree and to attain the range the thermal shrinkage coefficient of the polymer film has to be 0.02% or less.

Example 2

Next, polymer films having a thermal shrinkage coefficient of over 0.02% (0.03%, 0.05% and 0.09%) were subjected to annealing processing at 90° C. in the air for two hours by a hot plate in advance prior to adhesion so that the same samples as the above were prepared and a change value of a radial skew was measured in the same way as the above.

The results are shown in Table 2.

TABLE 2

| Thermal Shrinkage Coefficient Before Annealing (%) | Thermal Shrinkage Coefficient After Annealing (%) | Radial Skew Change (degree) |
|---|---|---|
| 0.03 | 0.01 | −0.06 |
| 0.05 | 0.01 | −0.08 |
| 0.09 | 0.02 | −0.09 |

From Table 2, it was found that the polymer films having a thermal shrinkage coefficient of over 0.02% could be made to have a thermal shrinkage coefficient in a range of 0.02% or less by being subjected to the annealing processing and a change of a radial skew when using this polymer film was suppressed to be within ±0.1 degree.

Note that in the above experiments, a difference from a change amount of a radial skew was measured by using a disk substrate wherein a polymer film is not adhered as a reference so as to eliminate a change amount of the disk substrate due to thermal processing.

The present invention is not limited to the above embodiments.

For example, a material and film thickness, etc. of a substrate composing an optical recording medium, optical recording layer and an adhesive layer between layers, etc. are not limited to those explained in the above embodiments and may be suitably selected.

Also, as a polymer film, those produced by a method other than the melt cast method can be used as far as the thermal shrinkage coefficient is 0.02% or less, and a material and a film thickness, etc. can be suitably selected.

Other than the above, a variety of modifications can be made within a scope of the present invention.

According to an optical recording medium of the present invention, a thermal shrinkage coefficient of a polymer film composing a light transmitting protective film is 0.02% or less, and thereby, shrinkage of the polymer film can be suppressed over a long time use and arising of warps on the optical recording medium can be suppressed.

Also, according to a method of producing an optical recording medium of the present invention, it is possible to produce an optical recording medium wherein a polymer film having a thermal shrinkage coefficient of 0.02% or less is adhered to an optical recording layer as a light transmitting protective film, so that shrinkage of the polymer film is suppressed over a long time use and arising of warps are suppressed.

INDUSTRIAL APPLICABILITY

An optical recording medium of the present invention can be applied to an optical recording medium for optically recording a large amount of information on an optical recording layer.

A method of producing an optical recording medium of the present invention can be applied to a method of producing an optical recording medium according to the above present invention.

The invention claimed is:

1. A method of producing an optical recording medium, comprising the steps of:
    forming an optical recording layer on a substrate; and
    forming a light transmitting protective film on said optical recording layer; wherein,
        the step of forming said protective film includes a step of adhering a polymer film having a thermal shrinkage coefficient of 0.02 % or less with respect to said optical recording layer by means of an adhesive layer, and a residual solvent in the polymer film is 0.3 % by weight or less.

2. A method of producing an optical recording medium as set forth in claim 1, wherein a polymer film produced by a melt cast method is used as said polymer film.

3. A method of producing an optical recording medium as set forth in claim 1, wherein annealing processing is performed on said polymer film after the step of producing the polymer film as a film and before the step of adhering to said optical recording layer in advance.

* * * * *